Oct. 24, 1950     J. BASS     2,526,840
CAMERA
Filed Aug. 31, 1948     6 Sheets-Sheet 2
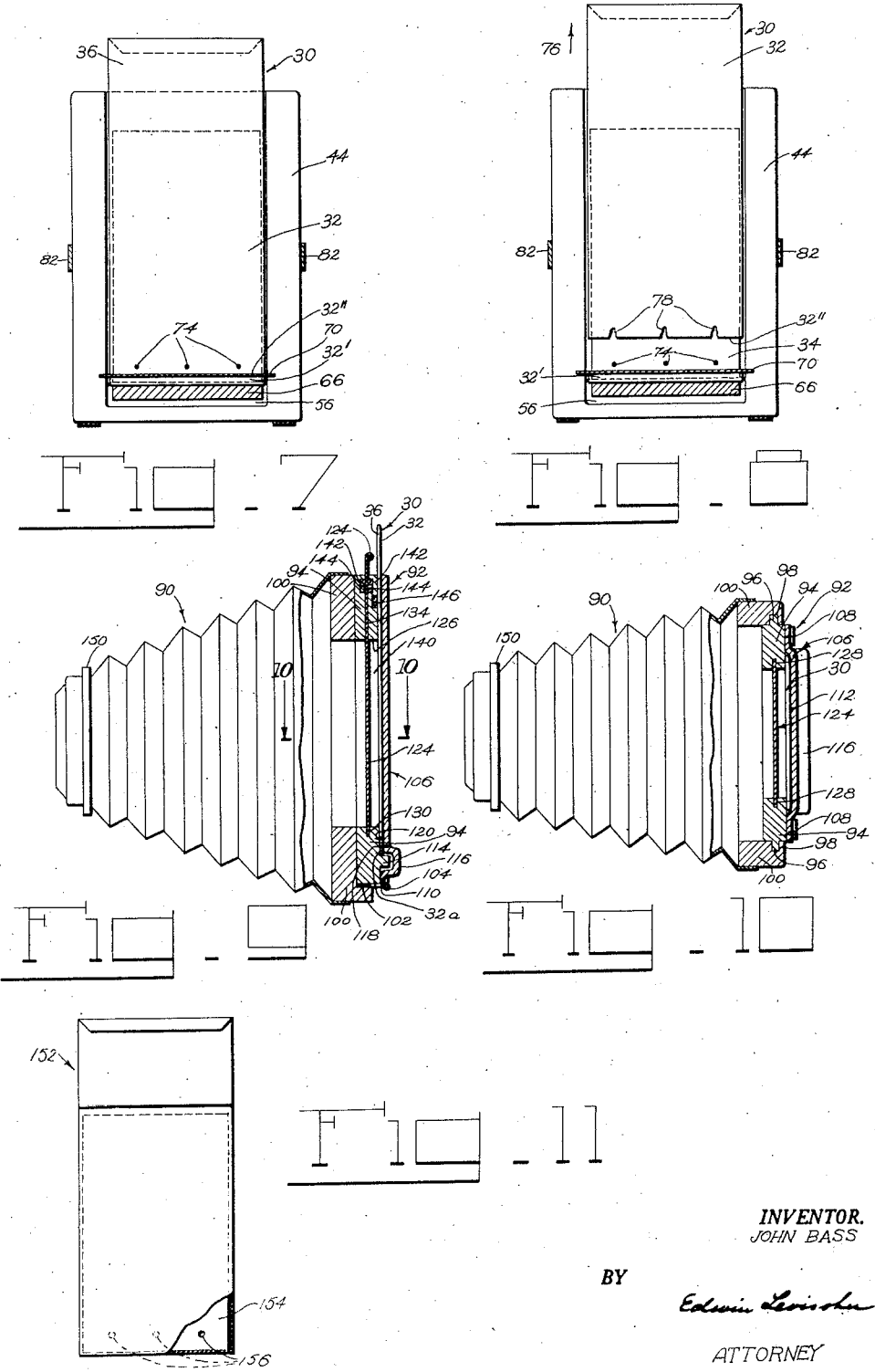
INVENTOR.
JOHN BASS
BY
Edwin Levinsohn
ATTORNEY

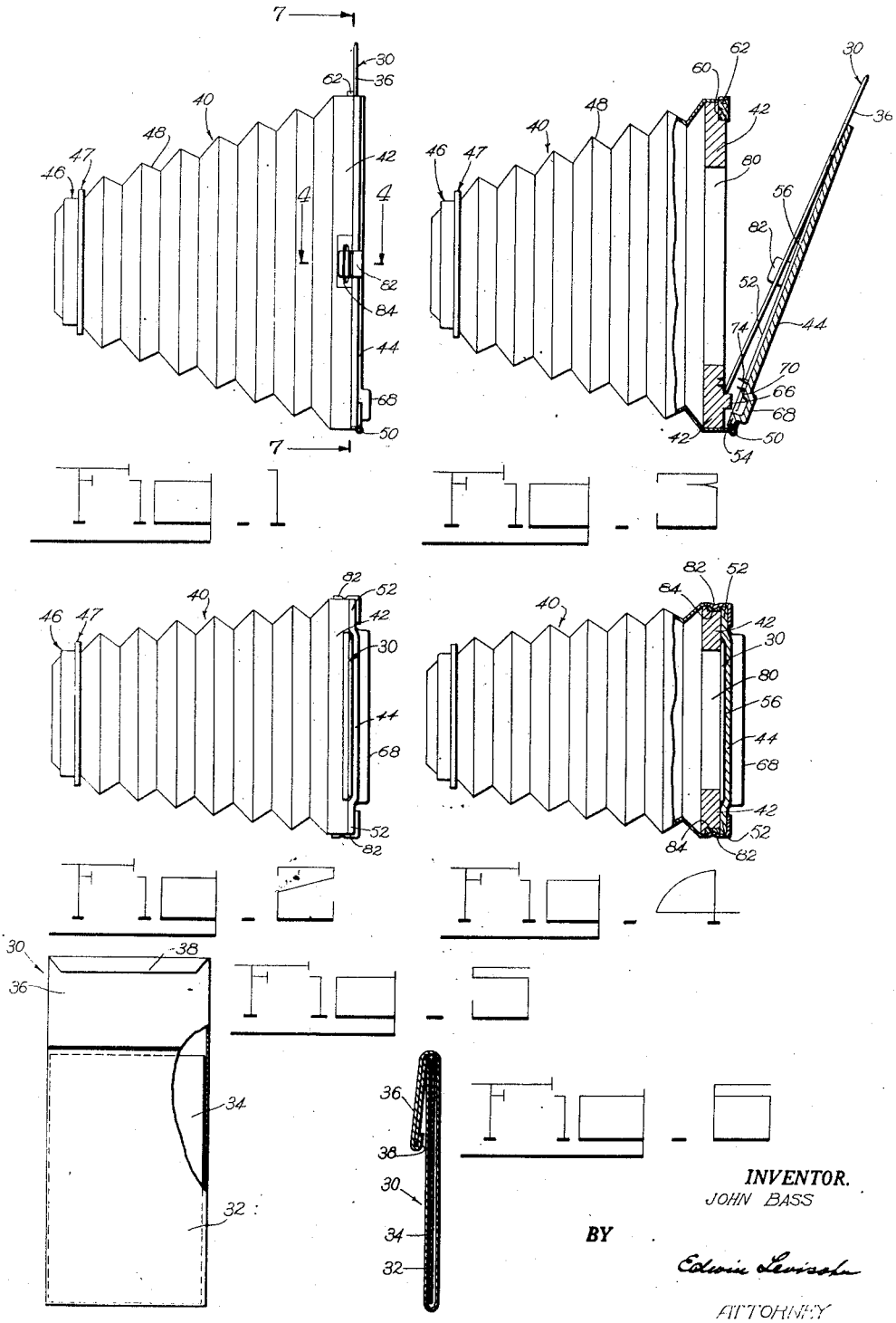

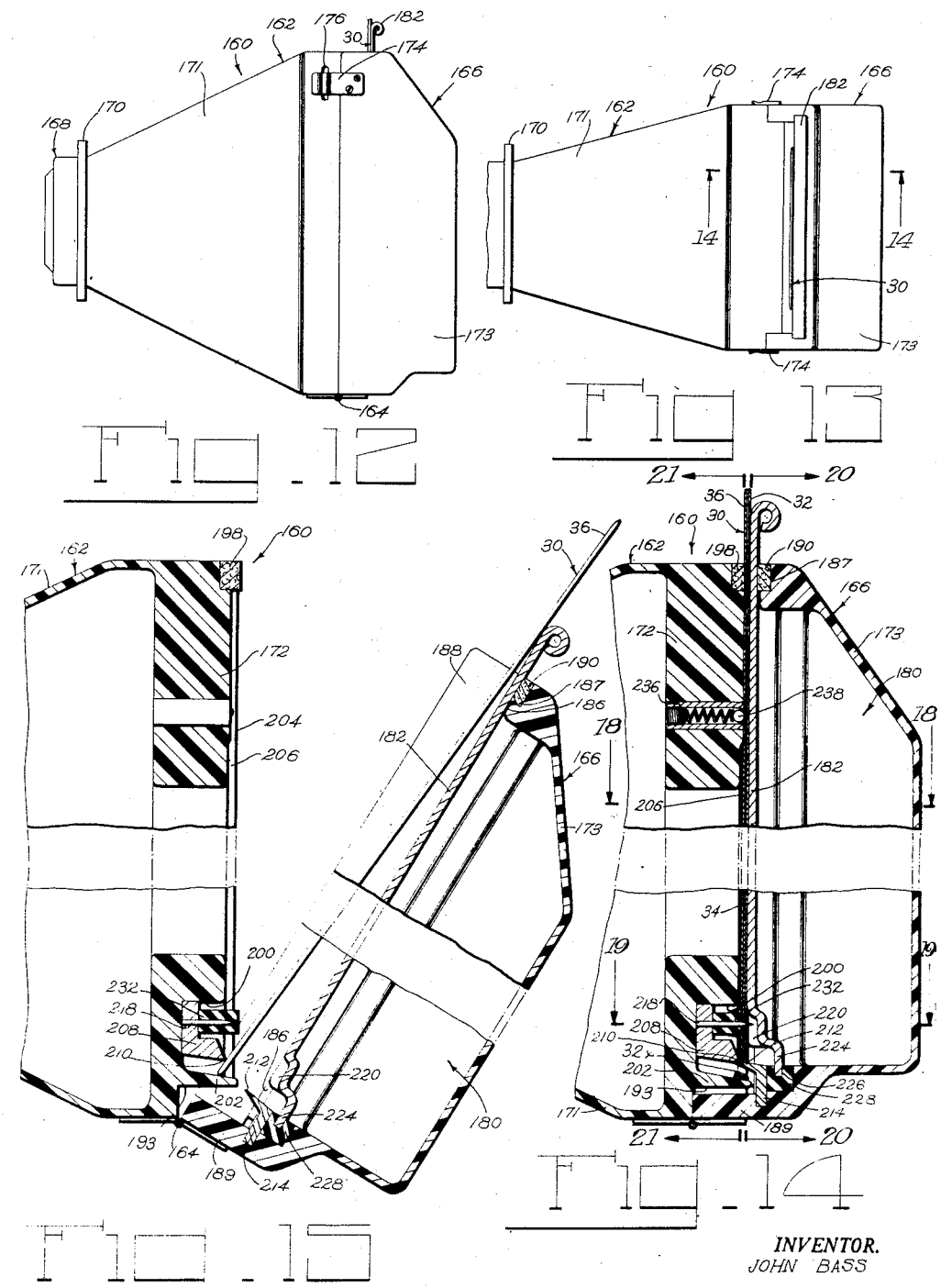

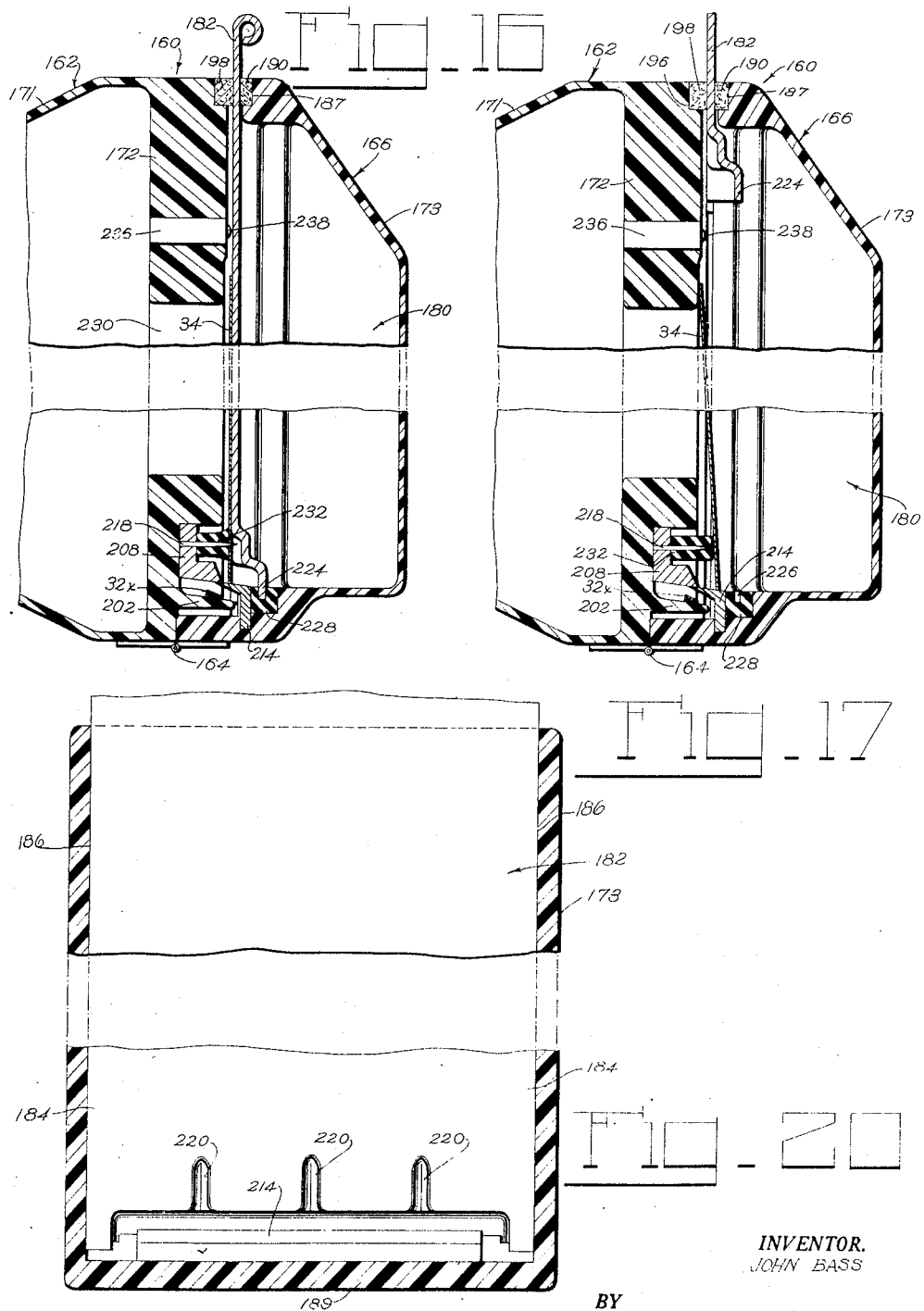

Oct. 24, 1950  J. BASS  2,526,840
CAMERA
Filed Aug. 31, 1948  6 Sheets-Sheet 5
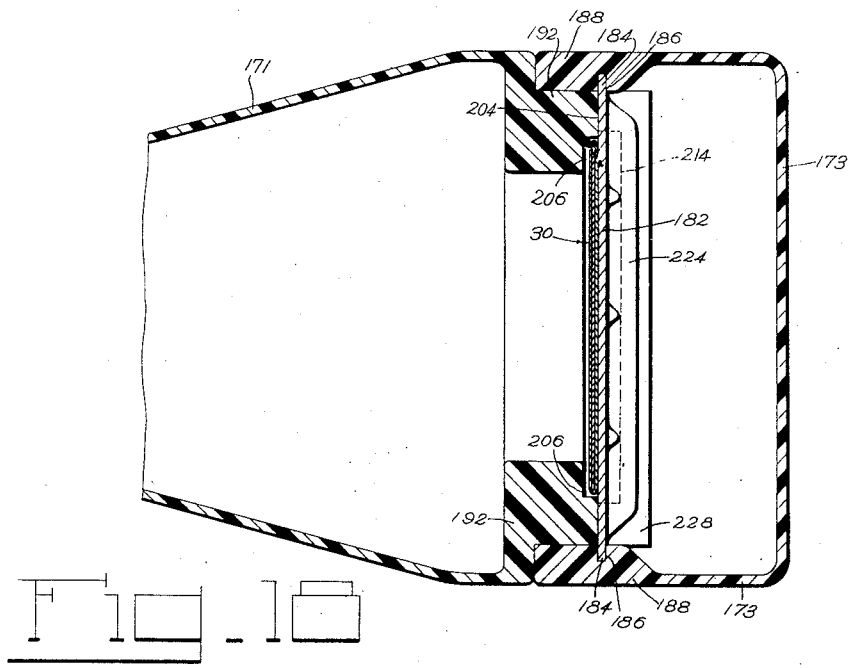
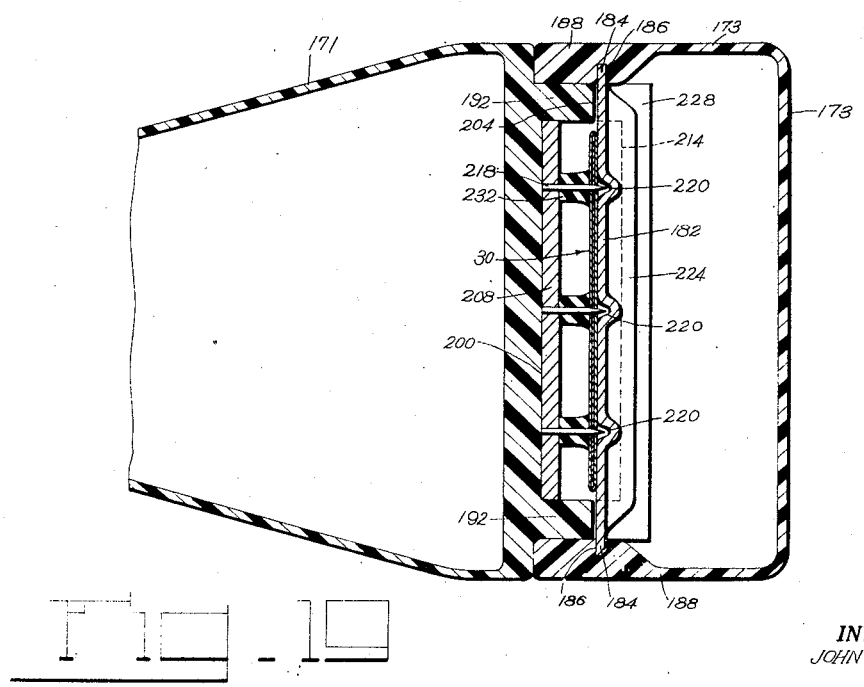
INVENTOR.
JOHN BASS
BY
Edwin Levinson
ATTORNEY Oct. 24, 1950 J. BASS 2,526,840
CAMERA
Filed Aug. 31, 1948 6 Sheets-Sheet 6
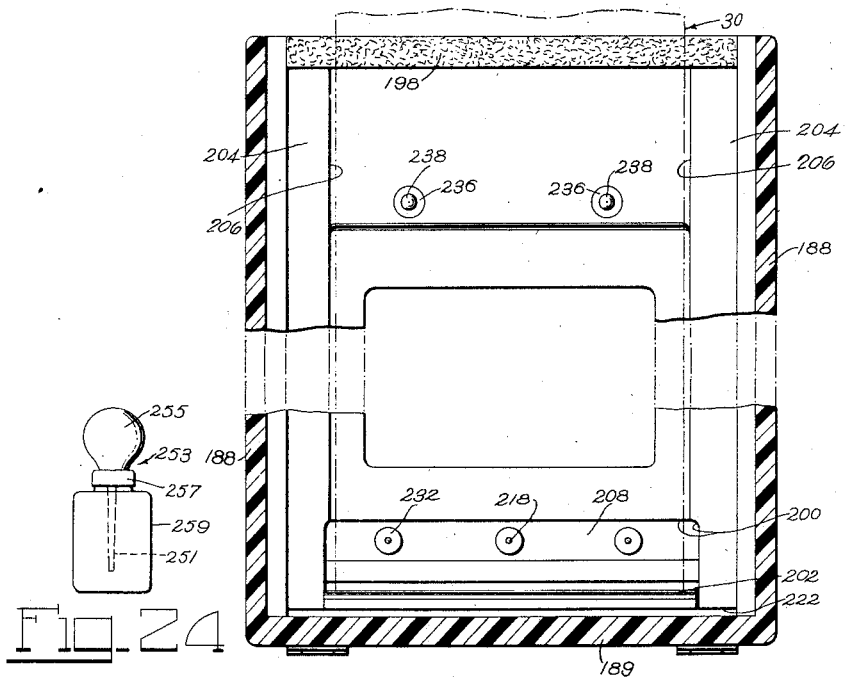
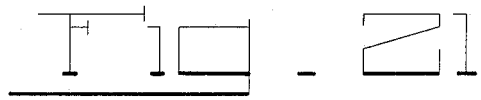
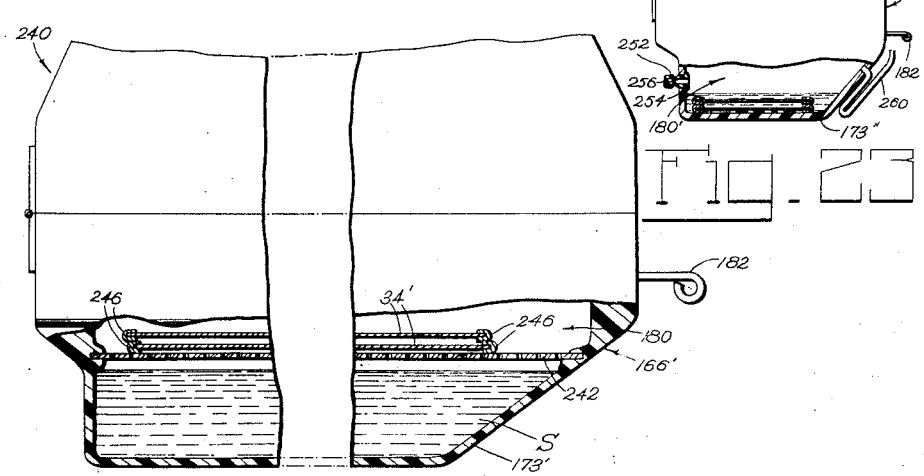
INVENTOR.
JOHN BASS
BY
Edwin Levisohn
ATTORNEY Patented Oct. 24, 1950

2,526,840

UNITED STATES PATENT OFFICE 2,526,840

CAMERA

John Bass, Miami Beach, Fla.

Application August 31, 1948, Serial No. 47,017

20 Claims. (Cl. 95—13)

This invention relates to photography in general, and to film holders for cameras in particular.

The film holder of the present invention is adapted for use with a known type of film package which is in the form of a sealed, light-impermeable envelope that is made from any suitable, readily pierceable and tearable material, and which is longer than the film contained therein so as to leave an end of the envelope beyond the contained film for a convenient handle. The method of extracting the film from the envelope involves impaling the envelope and contained film on one or more fixed pins, preferably near the closed film-discharge end of the envelope opposite the handle end thereof, cutting off the film-discharge end of the envelope to open the latter, and pulling the envelope at the handle end thereof away from the pins transversely of the latter, whereby the pins tear the envelope to the open, severed end thereof and the film remains impaled on the pins in correct position for its exposure.

It is the primary aim and object of the present invention to provide a film holder in or for a camera in which a film package of the above type may be placed in broad daylight, and in which film may subsequently be readily extracted from the package in accordance with the above method, without admitting light into the holder.

It is another important object of the present invention to provide a camera with interchangeable film holders, of which each holder may be loaded in broad daylight with a package containing a single film, the contained film may be extracted from the package for exposure by the camera when the holder is mounted in the camera, and the exposed film may remain safely stored in the holder, even after the latter is removed from the camera, until removal of the exposed film may safely be undertaken in a dark room.

It is another important object of the present invention to provide a day-loading camera of the above type with a dark film-storage chamber that may be opened and closed from the outside of the camera without admitting light thereinto, and into which an exposed film may be admitted, thereby to enable the user of the camera to reload the same in broad daylight.

It is another important object of the present invention to provide a day-loading camera of the above type in which an exposed film may be developed.

It is another important object of the present invention to provide a day-loading camera of the above type which may be re-loaded with successive film packages, and in which the exposed films may safely be stored and at any convenient time be developed simultaneously before their removal from the camera.

The above and other objects, features and advantages of the present invention will be more fully understood from the following description considered in connection with the accompanying illustrative drawings.

In the drawings:

Fig. 1 is a side elevation of a camera embodying the present invention;

Fig. 2 is a top plan view of the same camera;

Fig. 3 is a side elevation, partly in section, of the camera, showing the manner in which the camera is being loaded with a film package;

Fig. 4 is a fragmentary section through the camera, the section being taken on the line 4—4 of Fig. 1;

Fig. 5 is a face view, partly in section, of a film package that may be used in connection with the camera shown in Figs. 1 to 4;

Fig. 6 is a longitudinal section through the film package of Fig. 5, showing the same in folded condition, however;

Fig. 7 is a section taken substantially on the line 7—7 of Fig. 1;

Fig. 8 is a section similar to Fig. 7, illustrating the extraction of the film from a placed film package in the camera;

Fig. 9 is a side elevation, partly in section, of a modified camera having a removable film holder;

Fig. 10 is a fragmentary section through the modified camera, the section being taken substantially on the line 10—10 of Fig. 9;

Fig. 11 is a face view, partly in section, of a modified film package;

Fig. 12 is a side elevation of a further modified camera, providing a dark chamber for the safe storage of exposed films;

Fig. 13 is a fragmentary top plan view of the camera shown in Fig. 12;

Fig. 14 is an enlarged, fragmentary section through the modified camera of Figs. 12 and 13, the section being taken substantially on the line 14—14 of Fig. 13;

Figs. 15 to 17, inclusive, are sections similar to Fig. 14, illustrating different operating conditions of the camera as required by the use therein of film packages of the type shown in Figs. 5 or 11;

Figs. 18 and 19 are fragmentary sections taken substantially on the lines 18—18 and 19—19, respectively, of Fig. 14;

Figs. 20 and 21 are sections taken substantially on the lines 20—20 and 21—21, respectively, of Fig. 14;

Fig. 22 is a fragmentary side elevation, partly in section, of another modified camera, suitable for development therein of an exposed film or films prior to their removal therefrom;

Fig. 23 is a reduced fragmentary side elevation, partly in section, of a further modified camera which is suitable for the storage therein of an exposed but undeveloped film or films, as well as for the development therein of the exposed film or films at a convenient time and place; and Fig. 24 illustrates a container used for the injection of a liquid into, and for the withdrawal of the liquid from, the camera shown in Fig. 23.

Referring now to Figs. 5 and 6, there is shown a representative type of film package that may be used in the type of camera hereinafter described. Thus, the film package 30 may be in the form of an envelope 32, which contains a light-sensitive film 34 and extends with one end 36 considerably beyond the contained film 34 to serve as a convenient handle for a purpose hereinafter described. The contained film may rest against the opposite closed end of the envelope. The handle end 36 of the envelope 32 is originally open for the insertion of the film 34, and is thereafter sealed in any suitable way, as by means of a folded-back and preferably cemented tab 38 of the envelope, for instance. The envelope 32, which receives the film 34 in a dark room, is made of any suitable light-impermeable material which, for a purpose hereinafter described, may be torn without expending considerable force. Thus, the envelope 32 may be made, for instance, from inexpensive black paper of sufficient thickness to keep out light. For the correct use of the film package 30 in a camera, it is essential that the film 34 therein is prevented from sliding into the handle end 36 of the envelope. This may be accomplished in any suitable manner, as by folding the handle 36 back against the remainder of the film package 30 in the fashion shown in Fig. 6, and unfolding the handle portion 36 only when the film package is placed in a camera for the extraction of the film therefrom and the subsequent exposure of the extracted film by the camera. The material of the film 34 is preferably such that it may readily be impaled on a relatively sharp pin or pins.

The film package 30 may be used in a camera of the type shown in Figs. 1 to 4, inclusive. The camera 40 may comprise an apertured frame 42 of any suitable material, a hinged cover 44 thereon, any conventional lens mounting 46 and shutter mechanism 47, and expansible and contractable bellows 48. The bellows 48 may suitably be secured at its opposite ends to the lens mounting 46 and shutter mechanism 47 and to the frame 42, respectively. The cover 44 is so hingedly mounted at 50 on the frame 42 that the side and bottom margins 52 and 54, respectively, of the cover close uniformly against the frame 42 and do not admit any outside light into the interior of the camera. The side and bottom margins 52 and 54, respectively, of the cover 44 are offset from the remainder of the cover as shown in Figs. 3 and 4, so as to provide in the cover a depression 56 for the reception of a film package 30. In order to prevent light from entering the interior of the camera along the top of the closed cover 44, there may be secured in any suitable manner in a recess 60 in the frame 42 a pad 62 of any suitable compressible light-sealing material, such as felt or velvet, for instance. The frame 42 is preferably provided near its bottom with a rearwardly projecting ledge 66 that may extend lengthwise substantially throughout the width of the depression 56 in the cover 44 (Fig. 7), and serve as a support for a film package 30 as it is being placed in the camera (Fig. 3). The cover 44, which is preferably made of metal, is provided near its hinged bottom edge with a further recessed portion 68 that will clear the adjacent ledge 66 on the frame 42 when the cover 44 is closed. The cover 44 is preferably releasably locked in closed position by means of spring latches 82 which are suitably carried by the cover (Figs. 1 and 2) and cooperate with indented inserts 84 in the adjacent sides of the frame 42 (Fig. 4). Suitably mounted on the inner face of the cover 44, preferably a short distance above the adjacent ledge 66 on the frame 42, is a projecting knife blade 70 which, on closure of the cover 44, cuts off the bottom end 32' of the placed film package 30 from the remainder of the package which is thereby opened at the film discharge end 32'' thereof (Figs. 7 and 8). Also suitably secured to the inner face of the cover 44, preferably a short distance above the knife blade 70, are one or more relatively sharp pins 74 which, on closure of the cover 44, penetrate the envelope 32 and contained film 34 of the placed film package 30. Thus, the placed film package 30 is, on closure of the cover 44, cut off at its lower end, and is also impaled on the pins 74 in the manner shown in Fig. 7. The user of the camera next grips the handle end 36 of the film package that protrudes from the camera and withdraws the envelope 32 in the direction of the arrow 76 (Fig. 8). In doing so, the pins 74 tear the envelope 32 to the open discharge end 32'' thereof as shown at 78 in Fig. 8, while the film 34 remains impaled on the pins 74 in proper position behind the aperture 80 in the frame 42, ready for exposure when the shutter mechanism of the camera is actuated in a conventional manner.

Figs. 9 and 10 show a camera 90 which includes a removable film holder 92. Each film holder 92 comprises an apertured frame 94, having on its opposite sides projecting ribs 96 which are slidably received in guide grooves 98, respectively, in the adjacent apertured frame 100 of the camera 90. The inserted film holder 92 preferably rests with its bottom surface on a pad 102 of felt or any other cushioning material (Fig. 9). Suitably hinged at 104 on the frame 94 of the film holder is a cover 106 which may in all respects be like the cover 44 in Fig. 3. Thus, the cover 106 may be provided with a depression 112 for the reception of a film package 30, and also with a further depressed portion 116 that will clear a rearwardly projecting ledge 114 on the holder frame 94 when the cover 106 is closed. The cover 106 may releasably be locked in closed position by latch means (not shown) that may be like or similar to the latch means 82, 84 in Fig. 4. Suitably mounted on the inner face of the cover 106 a short distance above the adjacent ledge 114 on the holder frame 94 is a knife blade 118. The cover 106 carries on its inner face, preferably a short distance above the knife blade 118, one or more pins 120 with relatively sharp tips. The knife blade 118 and pins 120 may be arranged with respect to the holder frame 94 in the same relation in which the knife blade 70 and pins 74 are arranged with respect to the camera frame 44 (Fig. 8). Thus, on placing a film package 30 on the ledge 114 when the cover 106 is open, and then closing the cover 106, the knife blade 118 will cut off the lower end 32a of the placed film package 30, and the pins 120 will penetrate the envelope 32 and film 34 of the film package, as will be readily understood. The film contained in the package 30 may then be extracted by simply grasping the handle end 36 of the envelope 32 and withdrawing the latter in the manner indicated in Fig. 8, whereby the film will be retained on the pins 120 and is then ready for exposure by the camera. Before making the exposure, a slide 124 in the holder 92 is withdrawn to an extent where it clears the aperture 126 in the holder frame 94. The slide 124 is guided with its opposite side margins in grooves 128, respectively, in the frame 94 (Fig. 10), and is seated with its bottom margin in a groove 130 in the frame 94 when the slide 124 is in its innermost position. The slide 124 extends through a slot 134 in the holder frame 94 to the outside of the film holder 92 where it may be manipulated into its innermost and outermost positions. The slide 124 fits so accurately in the grooves 128 and 130 that no light will be admitted through the latter into the film compartment 140 of the holder 92 when the slide is in its innermost position as shown in Fig. 9. In order that no outside light may penetrate through the groove 134 into the film compartment 140 of the closed holder 92, there are preferably mounted in opposite recesses 142 in the frame 94 compressible pads 144, respectively, of felt or velvet, for instance. The holder frame 94 may further be provided with another compressible pad 146 of felt or velvet, for instance, which serves to prevent the passage of outside light into the film compartment 140 of the holder 92 through the depression 112 in the cover 106 thereof.

Thus, after correct placement of a film package 30 in the film holder 92 and subsequent closure of the cover 106 thereof, either before or after the film holder is mounted in the camera, and assuming that the slide 124 is in its innermost or closed position, the film may readily be extracted from the placed package 30 by withdrawing the envelope 32 thereof from the holder 92 in the above-explained manner. If the loaded film holder 92 has not already been mounted in the camera, it will then be mounted therein, whereupon the slide 124 is withdrawn so as to expose the film to the interior of the camera for its subsequent exposure when a conventional shutter mechanism 150 is actuated. After the film in the compartment 140 of the holder 92 is exposed, the slide 124 is slid into closed position and the film holder may then be removed from the camera and replaced by another film holder 92 for the exposure of another film therein. Thus, the instant camera 90 permits repeated day-loading commensurate with the number of film holders 92 available to the user of the camera.

Fig. 11 shows another film package 152 which may in all respects be like the above-described film package 30, except that the contained film 154 is provided with a plurality of holes 156 which are so arranged that they will align with the pins 74 or 120 of the cameras 40 and 90, respectively, when the film package 152 is correctly placed in either camera. In thus pre-perforating the film, the pins of either camera need no longer pierce the film, but will freely pass through the holes thereof.

Referring now to Figs. 12 to 17, inclusive, there is shown another camera 160 which is characterized by the provision of a dark chamber in which successively exposed films may be admitted for safe storage until they may be removed from the camera in a dark room or any other dark space. The instant camera 160 comprises a front section 162 and a rear section 166 which is suitably hinged at 164 to the front section 162. The front section 162 may comprise a box-like housing 171 which is provided with any suitable lens mounting 168 and shutter mechanism 170 at one end, and with an apertured wall 172 at the other end thereof (Fig. 15). The rear camera section 166 may releasably be held in the closed position shown in Figs. 12 and 13 by opposite spring latches 174, for instance, which cooperate with impressions 176 in the opposite sides, respectively, of the housing 171. The rear camera section 166 is in the form of a casing 173 which is open toward the front camera section 162. Both, the housing 171 and casing 173 may be made from any suitable material, and are shown in the present instance as being molded from plastic material.

The rear camera section 166 may be used as a film storage compartment 180 which is normally closed in light-sealed fashion by a slide 182 (Fig. 15) that is preferably made of metal. Slide 182 is movable with its opposite side margins 184 to and from closed position in guide grooves 186 in the opposite side walls 188, respectively, of the casing 173 (Figs. 15 to 19). Mounted in a recess 187 in the top of the casing 173 is a pad 190 of velvet or any other suitable material, which is in light-sealing engagement with the slide 182 (Fig. 15). In order that the slide 182 may, in the closed position of the rear camera section 166 (Fig. 14), be in close proximity to the adjacent end wall 172 of the housing 171, the opposite side walls 188 and bottom wall 189 of the casing 173 overlap the widthwise reduced side wall portions 192 and cut-away bottom wall portion 193, respectively, of the housing 171 in the manner shown in Figs. 13, 14 and 18. The end wall 172 of the housing 171 is, in the present instance, provided near the bottom thereof with a recess 200 of a width which exceeds that of an inserted film package 30, for instance (Figs. 19 and 21). The bottom of the recess 200 is defined by a ledge-like formation 202 of the end wall 172 which may extend beyond the adjacent rear face 204 of the latter (Fig. 15). Inasmuch as the slide 182 is in the closed position of the rear camera section 166, resting against the rear face 204 of the end wall 172 of the housing 171 (Fig. 18), and in order to provide a space for the reception of a film package between the end wall 172 of the housing 171 and the slide 182 in the closed casing 173, the rear face 204 of the end wall 172 is intermediate its opposite sides recessed at 206 from the top of the end wall 172 to the ledge 202 thereon (Figs. 18 and 21). In order to shield the recess 206 in the end wall 172 from outside light when the rear camera section 166 is closed and regardless of whether or not a film package is in the camera, there is provided at the top of the end wall 172 a pad 198 of velvet or any other compressible light-sealing material. Mounted in any suitable manner in the recess 200 in the end wall 172 of the housing 171 is a shear member 208, having a shearing edge 210 that cooperates with the shearing edge 212 of a companion shear member 214. Shear member 214 is, in the present instance, molded in the casing 173 in the manner shown in Fig. 15, for instance. The shear member 208 extends throughout the longitudinal extent of the recess 200 (Fig. 21), and the companion shear member 214 is of like longitudinal extent, so that a film package placed on the ledge 202 in the fashion shown in Fig. 15 will, on closure of the rear camera section 166, be severed by the cooperating shear members 208 and 214 near the bottom of the package, leaving thereby a cut-off bottom portion 32x of the film package lying on the ledge 202 in the fashion shown in Fig. 14.

Suitably mounted in the shear member 208, preferably a short distance above the shearing edge 210 thereof, are one or more pins 218 on which a placed film package becomes impaled on closure of the rear camera section 166 (Fig. 14). In order that the slide 182 may, in the closed position of the rear camera section 166, be moved into its open and closed positions, without engaging and dulling the tips of the pins 218, the slide is provided with impressed grooves 220 (Figs. 14, 19 and 20). The side margins 184 of the slide 182 may throughout their longitudinal extent be received in the opposite guide grooves 186 in the casing 173 (Fig. 20). A bottom margin 224 of the slide 182 intermediate the side margins 184 thereof is preferably offset rearwardly in the fashion shown in Figs. 14 and 19, so as to clear the shear member 214 and be in the closed position of the slide received in a groove 226, provided preferably in an insert 228 of rubber or a like material (Fig. 14). The side and bottom margins 184 and 224, respectively, of the slide 182 are so snugly received in their respective grooves 186 and 226 that no outside light may pass through the latter into the film compartment 180 when the slide is in its closed position.

Thus, with the slide 182 in its closed position, and after correctly placing a film package 30, for instance, on the ledge 202 in the manner shown in Fig. 15, the rear camera section 166 may be closed, whereby the film package 30 becomes located in the recess 206 in the end wall 172 of the housing 171 (Figs. 14 and 18). In the course of the closure of the rear camera section 166, the shear members 208 and 214 will cut off the bottom portion 32x of the film package, and the pins 218 will pierce the film package, as will be readily understood. The film 34 contained in the package may next be extracted and held in proper position on the pins 218, by simply gripping the handle end 36 of the envelope 32 of the package and withdrawing the latter from the camera in a manner similar to that shown in Fig. 8. The extracted film 34 (Fig. 16) may then be exposed on actuating the shutter mechanism 178 in the conventional manner. After exposure of the film 34, the slide 182 is retracted to the open position shown in Fig. 17 in order to admit the exposed film into the storage compartment 180. In order to strip the impaled film 34 from the pins 218 and thus assure the transfer of the film into the storage compartment 180, each of the pins 218 may be surrounded by a sleeve 232 of resilient rubber or a like material. The rubber sleeves 232 are, on closure of the rear camera section 218, compressed axially in the fashion shown in Fig. 16, and are on retraction of the slide 182 into open position permitted to recover and thereby strip the film 34 from the pins 218 (Fig. 17). Subsequent tilting of the camera will assure the transfer of the exposed film into the storage compartment 180, whereupon the slide 182 is pushed into its closed position. The rear camera section 166, may then be opened for the placement of the next film package into the camera. Thus, the user may load the camera in broad daylight with as many, or fewer, successive film packages as the storage compartment 180 will hold exposed films.

If film packages with pre-perforated films of the type shown in Fig. 11 are used in the instant camera 160, the resilient film strippers 232 may be dispensed with, as will be readily understood. Also, if desired, there may be provided in the end wall 172 of the housing 171 one or more sleeves 236, each of which contains a spring-urged ball 238 that will act as a stop for any exposed film which, after being stripped off the pins 218, may follow the slide 182 when the latter is being opened.

Reference is now had to Fig. 22 which shows a camera 240 that may in all respects be like the above-described camera 160, except that the compartment 180 is used as a development chamber containing a supply S of any chemical solution suitable for developing as well as fixing an exposed film. To this end, the side and bottom margins of the slide 182 are so accurately fitted in their above-described grooves 186 and 226, respectively, that, in the closed position of the slide and on 180 degrees inversion of the camera from the position shown in Fig. 22, none of the chemical solution will seep past the slide and escape from the chamber 180. In furtherance of this end, the pad 190 (Fig. 15) is in the instant camera 240 preferably made of any suitable liquid-sealing material, such as relatively soft, resilient rubber, for instance. The casing 173' of the instant camera is further provided with a preferably molded-in, perforated plate or screen 242 that may serve as a support for one or more exposed films 34'. While the films 34' may be of the type illustrated in Fig. 5 or in Fig. 11, the type of film preferably used in the camera 240 is embossed along one or more edges thereof as at 246, in order effectively to space the films proper from each other and thus assure that the exposed faces thereof will come into intimate contact with the chemical solution S on inversion of the camera 240 from the position shown in Fig. 22. The use of the instant camera 240 is in all respects as described in connection with the camera 160, except that the instant camera is always tilted into a position similar to that shown in Fig. 22 whenever the slide 182 is opened in order to keep the solution S from the interior of the camera.

Reference is now had to Fig. 23 which shows a camera 250 that differs from the camera 240 in that the compartment 180' may be used as a film storage compartment, as well as a film development chamber. The compartment 180' may, in contrast to the compartment 180 of the camera 240, not be provided with a perforated film support, but is provided with a light-impermeable filler 252 through which to admit into the compartment 180' a chemical solution or solutions and also water, depending on the type of film development used. The filler 252 may conveniently be made in the form of a short length of hose of resilient material, such as rubber, which is suitably secured in an opening 254 in the casing 173" and the outer end of which is pulled back over an intermediate length thereof so as resiliently to close the latter completely as shown at 256. Water and/or a chemical solution or solutions, as the case may be, may successively be injected into, and withdrawn from, the compartment 180' through the filler 252. In the instant case, this may be accomplished by inserting into the normally closed end of the filler the tubular discharge end 251 of an eyedropper-like injector 253 (Fig. 24) which has the conventional resilient bulb 255 and cap 257 that may, when the injector 253 is not in use, be screwed over the top of any suitable container 259, holding the particular solution or water. After an exposed film or films are transferred into the compartment 180' (Fig. 23), the solution or water, as the case may be, is introduced into the compartment 180' by the injector 253 through the filler 252, and is subsequently withdrawn by means of the same injector 253. The casing 173'' may further be provided with a vent 260 which, in the present instance, may be in the form of a repeatedly bent tube that prevents the passage of light into the compartment 180'. Any liquid injected into the compartment 180' may, after it has served its purpose, be conveniently withdrawn from the compartment in the above-described manner, by tilting the camera into a position in which the filler 252 is at the bottom thereof.

The compartment 180' of the instant camera 250 may be used as a film storage compartment, before being used for film development purposes.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. A combined film extractor and holder, comprising two opposite members, means connected with said members for guiding them for relative movement to and from closing relation with each other, said members having their adjacent faces formed to define together, in the closed relation of said members, a cavity which is open on one side and adapted to contain a length, including one end, of a film-holding envelope extending lengthwise through said open side, means on one of said members movable to sever an envelope in said cavity widthwise along said one end thereof, and a pin carried by one of said members and axially movable into said cavity to impale a contained envelope and film therein, said pin being disposed between said severing means and said open cavity side.

2. A combined film extractor and holder as set forth in claim 1, in which said severing means is a knife blade carried by one of said members and projecting from the cavity-defining face thereof, said knife blade being arranged to sever the contained envelope substantially on closure of said members.

3. A combined film extractor and holder as set forth in claim 1, in which said pin is carried by one of said members and projects from the cavity-defining face thereof, and said pin is arranged to impale the contained envelope and film therein on relative closing movement between said members.

4. A combined film extractor and holder as set forth in claim 1, further comprising on one of the cavity-defining faces of said members a surface on which to rest said one end of an envelope in correct position relative to said pin and severing means in the open relation of said members.

5. A combined film extractor and holder as set forth in claim 1, in which one of said members is provided with an aperture within the confines of its cavity-defining face, and there is further provided a slide movable in said apertured member to open and close said aperture for the admission therethrough of extraneous light into, and its interception from, said cavity, respectively.

6. In a camera having a light-excluding housing and lens and shutter mechanism at one end of said housing, the combination of two opposite members of which one member is in covering relation with the other end of said housing and has an apertured face confronting the other member, and said other member is outside the housing and pivotally connected with said one member for movement to and from closing relation therewith, the adjacent faces of said members being formed to define together, in the closed relation of said members, a cavity which is open on one side and adapted to contain a length, including one end, of a film-holding envelope extending lengthwise through said open side, means on one of said members movable to sever an envelope in said cavity widthwise along said one end thereof, and a pin carried by one of said members and axially movable into said cavity to impale a contained envelope and film therein, said pin being disposed between said severing means and said open cavity side.

7. The combination in a camera as set forth in claim 6, in which said apertured member is removably carried by the housing, and there is further provided a slide extending to the outside of said apertured member and being movable in the latter to open and close the aperture therein for the admission therethrough of extraneous light into, and its interception from, said cavity, respectively.

8. In a camera having a light-excluding housing and lens and shutter mechanism at one end of said housing, the combination of two opposite members of which one member is in covering relation with the other end of the housing and has an apertured face confronting the other member, and said other member is outside the housing and is in the form of a casing adapted to hold a film, said casing having an open end facing said one member and being carried by the latter for movement to and from closing relation therewith, a slide extending to the outside of said casing and being guided in the latter at said open end thereof for movement into open and closed positions in which to expose the interior of said casing to, and conceal it in light-sealed fashion from, said one member, respectively, said apertured face and closed slide defining, in the closed relation of said members, a cavity which is open on one side and adapted to contain a length, including one end, of a film-holding envelope extending lengthwise through said open side, means on one of said members movable to sever a contained envelope widthwise along said one end thereof, and a pin on the cavity-defining face of said one member, said pin being arranged between said severing means and said open cavity side and impaling a contained envelope and film therein on movement of said one member into closing relation with the other member.

9. The combination in a camera as set forth in claim 8, further comprising means carried by said one member and being operative on movement of said slide into its open position to strip the impaled film from said pins.

10. The combination in a camera as set forth in claim 8, further comprising a sleeve of resilient material surrounding said pin, said sleeve being axially compressed by a contained envelope on movement of said casing into closing relation with said one member, and being permitted to recover on movement of said slide into its open position, thereby stripping the impaled film from said pin.

11. The combination in a camera as set forth in claim 8, in which said casing is adapted to hold a liquid for treating an exposed film, and there is further provided means sealing said casing liquid-tight when said slide is in its closed position.

12. The combination in a camera as set forth in claim 8, in which said casing is adapted to hold a liquid for treating an exposed film, and is provided with a perforated partition adapted to support an exposed film, and there is further provided means sealing said casing liquid-tight when said slide is in its closed position.

13. The combination in a camera as set forth in claim 8, in which said casing is provided with a light-impermeable opening through which to introduce a film-treating liquid, and there is further provided means sealing said casing liquid-tight when said slide is in its closed position.

14. The combination in a camera as set forth in claim 8, in which said casing is provided with a light-impermeable vent and with a light-impermeable opening through which to introduce a film-treating liquid, and there is further provided means sealing said casing liquid-tight when said slide is in its closed position.

15. The combination in a camera as set forth in claim 8, in which said pin projects, in the closed relation of said members, to and beyond the adjacent face of said slide, said slide is in said adjacent face thereof provided with a depression extending in the direction of movement of said slide, and said pin is in alignment with said depression so as to clear said slide in any position of the latter.

16. The combination in a camera as set forth in claim 8, in which said pin is located in close proximity to said severing means and projects, in the closed relation of said members, to and beyond the adjacent face of said slide, said slide is in said adjacent face thereof provided with a depression extending in the direction of movement of said slide, and said pin is in alignment with said depression so as to clear said slide in any position of the latter.

17. In a camera having a light-excluding housing and lens and shutter mechanism at one end of said housing, the combination of two opposite members of which one member is in covering relation with the other end of the housing and has an apertured face confronting the other member, and said other member is outside the housing and is in the form of a casing adapted to hold a film, said casing having an open end facing said one member and being movable to and from closing relation with the latter, a slide extending to the outside of said casing and being guided in the latter at said open end thereof for movement into open and closed positions in which to expose the interior of said casing to, and conceal it in light-sealed fashion from, said one member, respectively, said apertured face and closed slide defining, in the closed relation of said members, a cavity which is open on one side and adapted to contain a length, including one end, of a film-holding envelope extending lengthwise through said open side, means on one of said members movable to sever a contained envelope widthwise along said one end thereof, and a pin on the cavity-defining face of said one member, said pin being arranged between said severing means and said open cavity side and impaling a contained envelope and film therein on movement of said one member into closing relation with the other member.

18. A combined film extractor and holder, comprising two opposite members pivotally connected for movement to and from closing relation with each other and having their adjacent faces formed to define together, in the closed relation of said members, a cavity which is open on one side and adapted to contain a length, including one end, of a film-holding envelope extending lengthwise through said open side, and a pin carried by one of said members and axially moving into said cavity to impale a contained envelope and film therein on movement of said members into closing relation with each other, said pin being, in the closed relation of said members, disposed between said severing means and said open cavity side.

19. In a camera having a light-excluding housing and lens and shutter mechanism at one end of said housing, the combination of two opposite members of which one member is in covering relation with the other end of said housing and has an apertured face confronting the other member, and said other member is outside the housing and is in the form of a casing adapted to hold a film, said casing having a light-impermeable opening through which to introduce a film-treating liquid, and an open end facing said one member and being pivoted on the latter for movement to and from closing relation therewith, a slide extending to the outside of said casing and being guided in the latter at said open end thereof for movement into open and closed positions in which to expose the interior of said casing to, and conceal it in light-sealed fashion from, said one member, respectively, and means sealing said casing light-tight when said slide is in its closed position, said apertured face and closed slide defining, in the closed relation of said members, a cavity for the reception of a film to be exposed through said aperture in said one member, and said open casing end surrounding a film in said cavity in the closed relation of said members.

20. The combination in a camera as set forth in claim 19, in which said casing is further provided with a light-impermeable vent.

JOHN BASS.

REFERENCES CITED

The following references are of record in the file of this patent:

UNITED STATES PATENTS

| Number | Name | Date |
|---|---|---|
| 1,424,816 | Grillone | Aug. 8, 1922 |
| 1,794,382 | Josepho | Mar. 3, 1931 |

FOREIGN PATENTS

| Number | Country | Date |
|---|---|---|
| 114,921 | Germany | Nov. 13, 1900 |